(12) United States Patent
Rychikhin

(10) Patent No.: US 10,732,953 B2
(45) Date of Patent: Aug. 4, 2020

(54) SYSTEMS AND METHODS FOR USING GRAPHS FOR APPLICATION UPDATES

(71) Applicant: salesforce.com, inc, San Francisco, CA (US)

(72) Inventor: Yuri Rychikhin, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/169,343

(22) Filed: May 31, 2016

(65) Prior Publication Data

US 2016/0274898 A1    Sep. 22, 2016

Related U.S. Application Data

(63) Continuation of application No. 13/935,289, filed on Jul. 3, 2013, now Pat. No. 9,383,988.

(60) Provisional application No. 61/667,707, filed on Jul. 3, 2012.

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

Non-Final Office Action for U.S. Appl. No. 13/935,289 dated Apr. 23, 2015, 33 pages.

(Continued)

*Primary Examiner* — Duy Khuong T Nguyen
*Assistant Examiner* — Melissa A Headly
(74) *Attorney, Agent, or Firm* — Jaffery Watson Mendonsa & Hamilton LLP

(57) ABSTRACT

A sequence of update steps from a currently installed version an application on a remote client device to a new version of the application to be installed on the client device is determined. A representation of updates from the currently installed version to the new version of the client application is built. The representation is stored in at least one memory device. A shortest path between the currently installed version of the client application and the new version of the client application is determined. An update is determined from a combination of the sequence of update steps unique to the shortest path between the currently installed version of the application and the new version of the application. An update package is built to update the currently installed version of the client application to the new version of the client application.

19 Claims, 11 Drawing Sheets

(56) References Cited

U.S. PATENT DOCUMENTS

| | | | |
|---|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,610,387 B1* | 10/2009 | Liskov .............. H04L 29/12066 340/852 |
| 7,620,655 B2 | 11/2009 | Larsson et al. |
| 8,352,384 B2 | 1/2013 | Mansinghka et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0027864 A1 | 2/2007 | Collins et al. |
| 2008/0082555 A1 | 4/2008 | Salmon |
| 2008/0295088 A1* | 11/2008 | Bhat ...................... G06F 8/656 717/170 |
| 2009/0198684 A1 | 8/2009 | Collins et al. |
| 2010/0070528 A1 | 3/2010 | Collins et al. |
| 2010/0241951 A1 | 9/2010 | Vandervort et al. |
| 2011/0004668 A1 | 1/2011 | Salmon et al. |
| 2011/0055152 A1* | 3/2011 | Jang ...................... G06Q 10/10 707/622 |
| 2011/0082854 A1 | 4/2011 | Eidson et al. |
| 2011/0246449 A1 | 10/2011 | Collins et al. |
| 2011/0258178 A1 | 10/2011 | Eidson et al. |
| 2011/0258179 A1 | 10/2011 | Weissman et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0289091 A1 | 11/2011 | Collins et al. |
| 2011/0295838 A1 | 12/2011 | Collins et al. |
| 2011/0295839 A1 | 12/2011 | Collins et al. |
| 2011/0320435 A1 | 12/2011 | Collins et al. |
| 2012/0023375 A1 | 1/2012 | Dutta et al. |
| 2012/0089569 A1* | 4/2012 | Mason, Jr. .......... G06F 16/1774 707/639 |
| 2012/0131068 A1 | 5/2012 | Scotton et al. |
| 2012/0151062 A1 | 6/2012 | Gusev et al. |
| 2012/0272228 A1* | 10/2012 | Marndi .................. G06F 8/65 717/170 |
| 2012/0233354 A1 | 12/2012 | Salmon et al. |
| 2012/0330924 A1 | 12/2012 | Rajan et al. |
| 2012/0330926 A1 | 12/2012 | Rajan et al. |
| 2013/0018890 A1 | 1/2013 | Rajan et al. |
| 2013/0054648 A1 | 2/2013 | Mehta et al. |
| 2014/0012817 A1 | 1/2014 | Kim et al. |
| 2014/0040235 A1 | 2/2014 | Rajan et al. |
| 2014/0081950 A1 | 3/2014 | Rajan et al. |

OTHER PUBLICATIONS

Final Office Action for U.S. Appl. No. 13/935,289 dated Oct. 7, 2015, 33 pages.

Notice of Allowance for U.S. Appl. No. 13/935,289 dated Mar. 10, 2016, 10 pages.

(56) References Cited

OTHER PUBLICATIONS

Correected Notice of Allowability for U.S. Appl. No. 13/935,289 dated Jun. 2, 2016, 7 pages.

* cited by examiner ns and mechanisms that use the Internet to retrieve data, the one or more implementations and techniques are not limited to using the Internet to retrieve data.

SYSTEMS AND METHODS FOR USING GRAPHS FOR APPLICATION UPDATES

CLAIM OF PRIORITY

This application is a continuation of U.S. patent application Ser. No. 13/935,289 entitled "SYSTEM AND METHOD FOR USING DIRECTED ACYCLIC GRAPH (DAG) FOR APPLICATION UPDATES," by Yuri Rychikhin, filed Jul. 3, 2013, which claims the benefit of U.S. Provisional Patent Application 61/667,707 entitled "SYSTEM AND METHOD FOR USING DAG FOR APPLICATION UPGRADES," by Rychikhin, Yuri, filed Jul. 3, 2012, the entire contents of both are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to systems for application updates for applications stored on a client's devices.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Software application installation and update is an area of increasing importance. Once installed, there may be a need to change an application. The changes to the application may be significant in which case an update may be needed. There are several problems with traditional methods of upgrading software applications. There may be many versions of the code in use, and the provider of the software may need to write a different update for updating each of the versions in use to the current version. Further, there may be more than one current version of the code that is available to different users, users having different levels of service, and/or users running different types of smart phones or computers. Writing a different update for each pair of prior versions and current versions may be a time consuming process that needs to be repeated every time there is a new release of a new version of the code.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
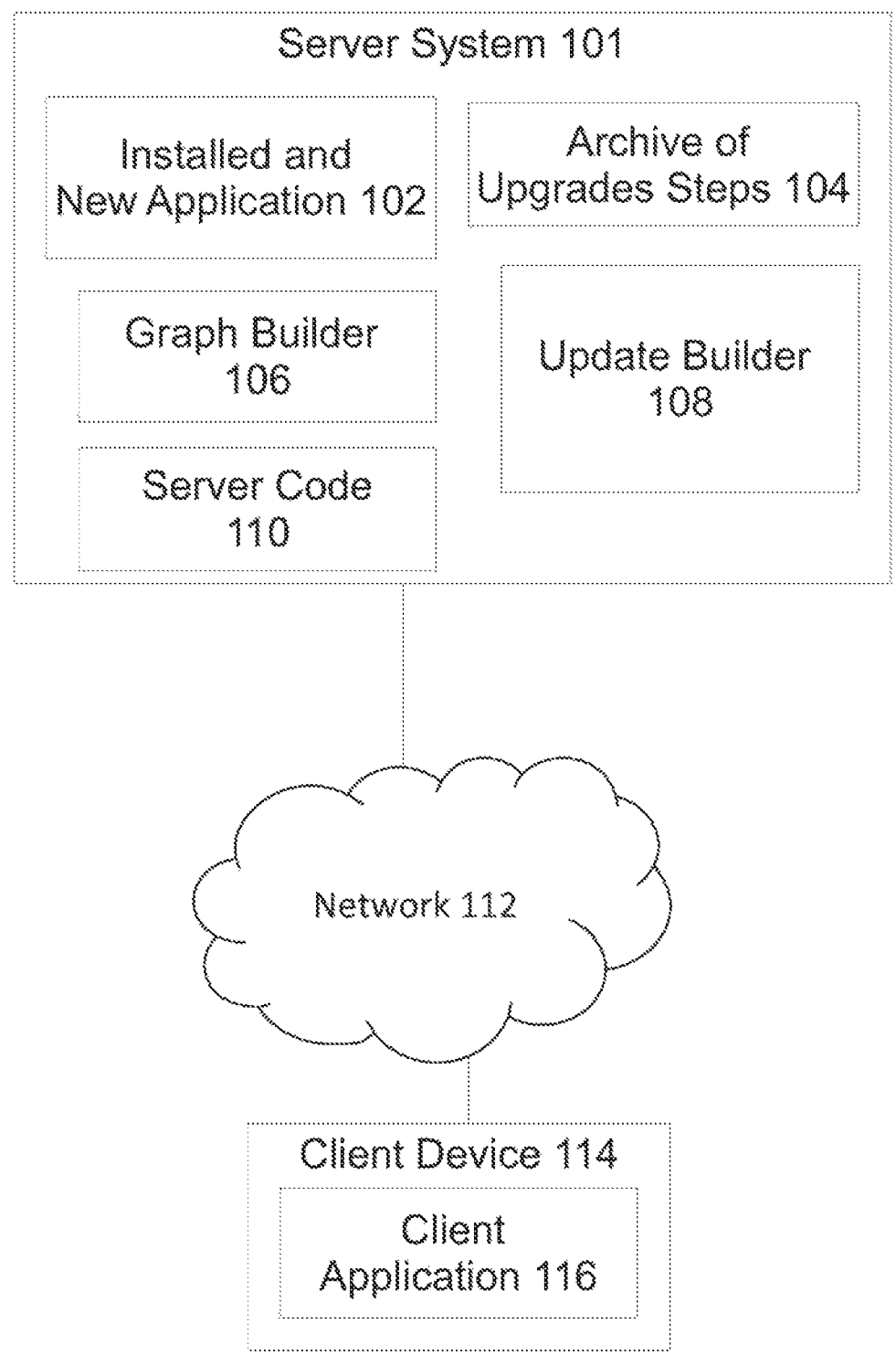
FIG. 1 illustrates a block diagram of an example of a system for using directed acyclic graph (DAG) for application updates.

In accordance with embodiments, there are provided mechanisms and methods for using directed acyclic graph (DAG) for application updates. In this specification, the terms update and upgrade are used interchangeably—one term may be substituted for the other anywhere in the specification to obtain different embodiments. These mechanisms and methods for using directed acyclic graph (DAG) for application updates can enable embodiments to provide by a machine having a processor system including at least one processor and a memory system communicatively coupled to the processor system, a sequence of update steps that do not require a format change; based upon the currently installed version and the version being installed, combining the sequence of steps that do not require a format change into one update step, and performing, the resulting update step.

In an embodiment, updates that do not involve a format change may involve not making any change and may be referred to as no operation updates. In this specification, combining updates is generic to skipping the updates. The updates that do not involve a format change generally do not involve changes to the user application that affect subsequent versions of the application, and may therefore may usually be combined by skipping or essentially skipping the updates that do not involve the format changes. Optionally, other changes that do not affect subsequent applications are also detected. For example, if one or more updates undo one more format changes that were made by one or more prior updates, and if the current version precedes the update having the initial change in the format, then the updates having the format changes and the undoing of the format changes may be combined, since the net effect is no change in the format.

While one or more implementations and techniques are described with reference to an embodiment in which methods for using DAG for application updates is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. In a multitenant system, the tenants may have customers, clients, employees, and officers whom may be granted access to the multitenant data as a result of the tenant having access. In an embodiment, the multitenant database is provided to the tenant on-demand, meaning that the tenant does not need to worry about how to maintain or program a database. The multi-tenant database it provided to the tenant as a service, and the tenant only needs to learn how to use the interface provided by the multitenant database (interface to the multitenant database may be provided over the internet, via webpages and/or smart phone applications that specifically concerned with for interacting with the multitenant database). As used herein, the term query plan refers to a set of steps used to access information in a database system. Next, mechanisms and methods for providing a system for using DAG for application updates will be described with reference to example embodiments.

FIG. 1 illustrates a block diagram of an embodiment of a system 100 for methods of using directed acyclic graph (DAG) for application updates, which may include embodiments of server system 101, installed and new codes 102, archive of update steps 104, graph builder 106, update builder 108, server code 110, network 112, client device 114, and client application 116. The elements previously listed will be discussed in detail subsequently in the specification. In other embodiments, system 100 may not have all of the elements or components listed above and/or may have other elements or components instead of or in addition to those listed.

System 100 is a system in which a client device needs an update for an application that interfaces with application running on a server. Each time an update to an application occurs, typically, code must be written for the update. However, it may not be necessary, when a new version does not include a format change, to make that update. The update may be an update to an application that runs on a smart phone application. Although the specification discusses format changes any change that does not affect subsequent versions of the application may be included. A format change is one that changes the structure of the underlying schema and/or manner in which the data is stored. For example, a change that involves adding a column to the table is an example of a format change. While changes that result simply in the use more rows would not be format changes. Other format changes may involve adding one or more new tables, and/or changing which tables are linked to which other tables.

The savings in time for writing updates and the savings in time in installing an update can be significant, because some applications running on a user system interfacing with the multitenant database (or other server) may go through a large number of versions as a result of changes to the database and/or database server. Consider a situation in which application A has been updated 40 times, writing special update programs for updating the application from each version to the current version may be expensive. If a user has version 1 on the user's smart phone, for example, and wants to purchase an update to the newest version (e.g., version 40), it may not be clear how to automatically construct an update, because some of the updates may not require any operations to be performed. However, if a system and method could automatically identify whether an update to any of the versions would not require a format change, the number of updates and the application on the smart phone may be reduced. This could result in a quicker process for the user and a simpler process for the creator of the application. Using the methods discussed herein, an update can occur skipping unnecessary steps.

Server 101 is the server with which the client application interacts. Server system 101 may be an on-demand multi-tenant database (an example of a multi-tenant database is discussed below in conjunction with FIGS. 8-11). Server system 101 automatically computes an appropriate update between any old version of an application and any current version of the application, based on code for incremental update steps between subsequent versions of the application. Installed and new codes 102 are copies of the new version of the code and the code that is currently running on the user system. Installed and new codes 102 may be used to identify the updates needed to update the currently installed version of the code to the new version of the code desired by the user.

Archive of update steps 104 is an archive of different update steps. Each update step is the change in code that needs to be performed to update from one version to another version of the client code. Optionally, archive of update steps 104 may include a table correlating identifiers of the update steps with an identifier of the version being modified and an identifier of the version that results from applying the update. To update from one version of the client application to another version of the client application, it may be necessary to install multiple update steps. For example, in updating from version 12 to version 16, it may be necessary to perform the update steps from version 12 to 13, from version 13 to 14, from version 14 to 15 and from version 15 to 16. Some update steps may involve a format change and some update steps may not. Archive of update steps may be missing updates to the user application between versions for which there was no format change of the schema stored on the server.

Graph builder 106 provides functions to assist the update builder in producing a graph of the versions and determine which versions include a format change. Graph builder may initially construct an incomplete graph based on the update steps stored in the archive of updates, then later determine which version update steps are missing from the graph. Then the graph is supplemented with information for filling the portions of the graph that correspond to the missing versions and updates. In other words, the initial graph constructed by graph builder 106 may be disjointed and may be missing nodes. For example, if there was a format change between versions 7 and 8 and format change between version 10 and 11, but no format change between version 8 and 10, and the user is updating from version 7 to 11, the initial graph may only have nodes for versions 7 and 8 and nodes for versions 10 and 11, but no nodes for versions 9 and no connection between versions 8 and 10. Graph builder 106 may fill in the rest of the graph automatically.

Update builder 108 builds the update from the installed version of the client code to the new version of the client code, for the updates steps stored in the archive of update steps 104, based on the graph constructed from graph builder 106.

Update builder 108 automatically determines a sequence of update steps for updating a particular application, based on the graph constructed by graph builder 106. Update builder skips updates of versions for which no operation needs to be performed. In other words, update builder 108 automatically computes the update needed to update a particular version of the application with a current version of the application, based on a series of the update steps.

Server code 110 is the code that runs on the server, with which the client application interfaces. In an embodiment, server code 110 may interact with a database having a schema with multiple tables having multiple columns and rows. Some of the updates may involve a format change to the schema, such as adding a column to one or more tables of the schema.

Network 112 may be any combination of a computer network, wireless network, and/or phone network, via which server system 101 communicates with the user device. Client device 114 is any client device onto which the update is being installed. For example, client device 114 may be a smart phone or tablet computer. Client application 116 is the application being updated by server system 101. Client application 116 interfaces with server code 110. In an embodiment, client application 116 is the interface that the user uses for interacting with server code 110. A format change, such as an addition of a column to one of the tables of the schema may not affect the manner in which client application 116 runs, and consequently the update related to a format change may be just an indication as to which version of the application server code 110, client code 116 is interfacing with.

Figure 2:
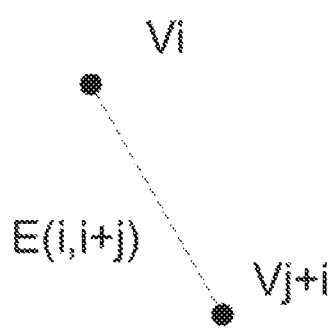
FIG. 2 is a diagram illustrating an example of two nodes and an edge of a graph used with reference to an embodiment of a system for using DAG for application updates.

FIG. 2 is a diagram of a graph 200 of an example of an update. Graph 200 includes version V(i), version V(i+j) and update E(i,i+j). In other embodiments, graph 200 may include other elements and/or may not include all of the elements listed above.

As shown in FIG. 2, a series of version changes may be represented as a Directed Acyclic Graph (DAG). Version V(i) is an initial version that needs to be updated, which is represented by a node on the graph. Version V(i,i+j) is the desired version that the update is intended to generate. Update E(i,i+j) is the combination of update operations to update from version V(i) to version V(i+j), which is represented by an edge of graph 200. In other words, the versions V(i) and V(i+j) are represented as vertices (or nodes) in the Direct Acyclic Graph (DAG). The update steps are represented as edges (pictorially represented as lines) between the nodes of DAG. An update step from version V(i) to version V(i+j) is represented as E(i, i+j).

Figure 3A:
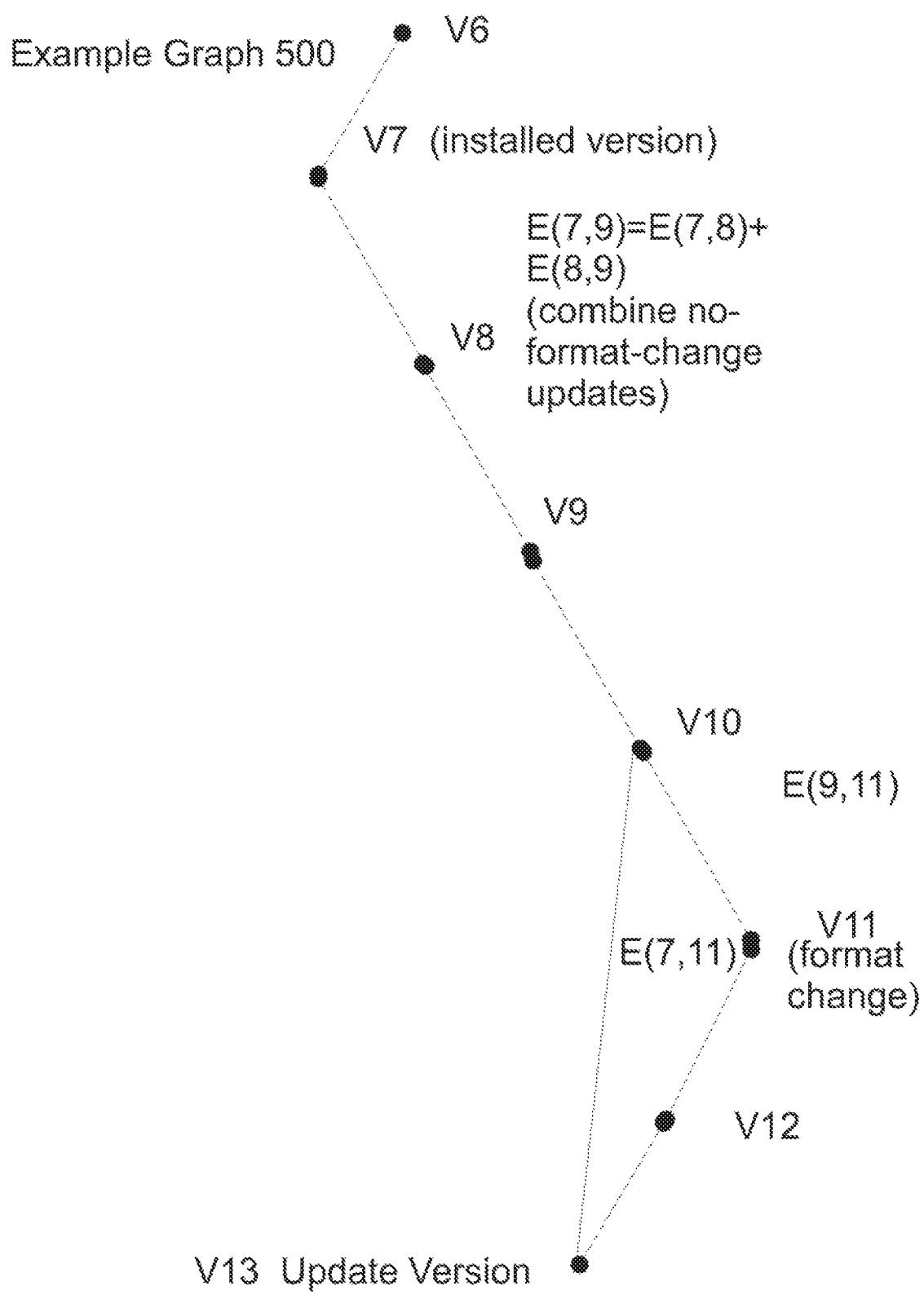
FIG. 3A is a diagram illustrating an example of a completed version graph used for an embodiment of a system for using DAG for application updates.

FIG. 3A is a diagram showing an example of a graph for a set of updates. Graph 300A includes versions V6-V13 connected by edges. In other embodiments, graph 300A may include other elements and/or may not include all of the elements listed above.

In FIG. 3A each version is connected to the subsequent version. Some update steps involve format changes and some update steps do not involve changes in format. In the example, the nodes and edges are attached linearly. To graphically depict a format change, after the format change the direction of the edges of the graph changes. In the example of FIG. 3A, the direction changes after the node for version V7 and after the node for version V11 to indicate that versions V7-V10 have a different format than version V6 and that versions V11-V12 have a different format than versions V7-V10.

Although a format change occurs in the update corresponding to the edge connecting version V10 and V11, there may also be a format change that occurs in the update corresponding to the edge connecting version V12 and V13. The line connecting version V10 to version V13, indicates that there is an edge connecting versions V10 and V13, indicating that the intervening updates may be skipped. For example the update from version V12 to V13 may undo format change of the update form version V10 to V11.

The combination of two update steps, such as E(7,8) and E(8,9), can be represented as one update step, such as E(7,9)=E(7,8)+E(8,9). In the example, if version V6 is the installed version and version V13 is the new version to which it is desired to update, since only the updates to versions V7, V11 and V13 involved a format change, the shortest path to update V7 to V13 can involve skipping any updates that do not include format changes (e.g., V8, V9, V10, and V12) or combining the updates that do not have a format change with one update that has a format change, E(7,8), E(8,9), E(9,10), E(10,11), result in update E(7, 11). Thus, one update step to V11 may be performed to update from version V7 to version V11, which may be represented as E(7,11). Similarly, in updating from version V11 to version V13, the updates from version V11 to version V12 (e.g., E(11,12)) and from version V12 to V13 (e.g., E(12, 13)) may be combined, because no format change is associated with update E(11, 12). Consequently, the update from version V7 to V13 may be performed by update steps E(6,7), E(7,11), E(11, 13).

However, since the line between version V10 and V13 indicates that when updating between version V10 one can skip to version 13, the updates between version V10 and version V11, and between version V12 and version V13 may be skipped. For example, it may be that one update undoes the format changes of the prior update. Consequently the set of updates that need to be performed may be collapsed to E(6,7) and E(7,13), in which the upgrade steps E(7,13) is a no operation upgrade step.

Figure 3B:
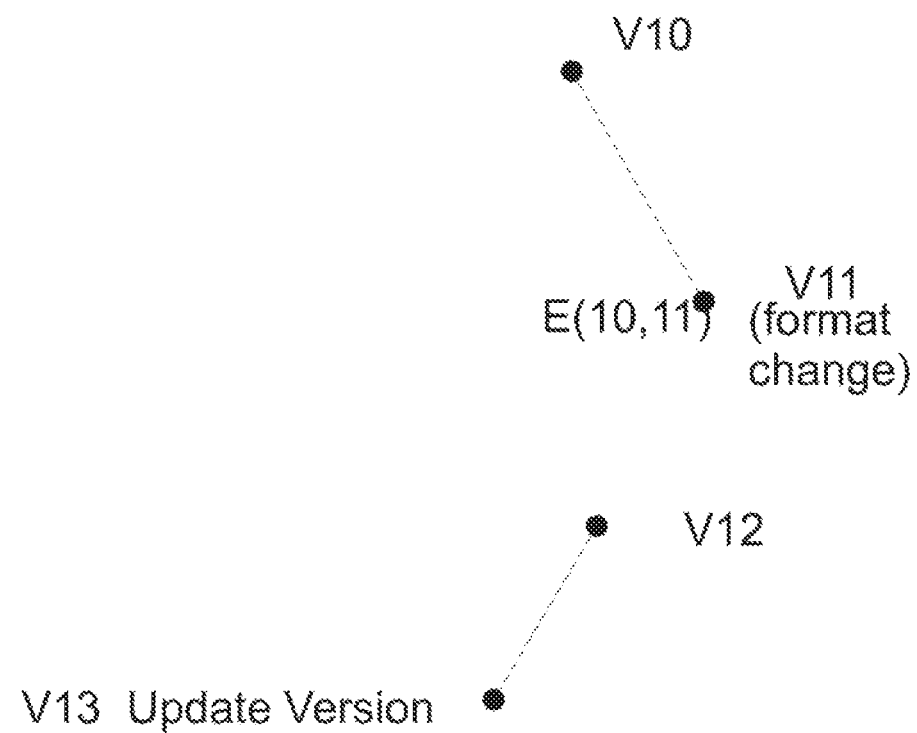
FIG. 3B is a diagram illustrating the version graph of FIG. 3A may appear prior to being completed.

FIG. 3B shows an initial version of FIG. 3A. Graph 300B includes versions V6, V7, V10, V11, V12, and V13. In other embodiments, graph 300B may include other elements and/or may not include all of the elements listed above.

In graph 300B versions V6 and V7 are connected by edges, version V10 and V11, are connected by edges, and versions V12 and V13 are connected by edges. Graph 300 B is the initial version of graph 300A, based on the information stored in archive of update steps 104 (FIG. 1) before graph 300B is completed. The only update steps stored in archive of update steps 104 may be update step E(6,7), E(10,11) and E(12,13), and consequently, the only information expressly available is enough for graph builder 106 to build the graph of FIG. 3B. However, it may be that the user has version V9. Were the computer program to inspect the graph of FIG. 3B, there is no edge or path indicating how to update from version V9 to any other version, which creates a problem for an automated process in determining how to update version V9. Consequently, to simplify the automation, graph builder 106 automatically fills in the rest of the graph and optionally creates edges and nodes, corresponding to version and update steps in which no format change is needed to perform the update. Optionally, an indication is created that no operation needs to be performed for the edges of the graph that were newly filled in, for example. Once the graph is complete (resulting in graph 300A of FIG. 3A), a methodical method may be used to build an update updating V9 to another version. For example, starting with node V9, each node may be inspected sequentially to determine whether any operation is needed to perform the update or the update step that needs to be performed. Then, each update step that needs to be performed is performed in sequence as indicated by the graph 300A.

In general, the current installed version and the version to be installed may be separated by any number of other versions. For example versions $V(i-n) \ldots, V(i-1)$ may have one format of data, versions $V(i), \ldots, V(i+j-1)$ may have a different data format, versions $V(i+j), \ldots, V(i+j+k-1)$ may also yet a different format compared to the previous versions $V(i), \ldots, V(i+j-1)$, and versions $V(i+j+k), \ldots$ may need yet another data format. The number of updates steps that server 101 can accommodate may be unlimited. There could be cases, where $V(i+j+k)$ may have the same data format as $V(i), \ldots, V(i+j-1)$, even though there were intervening version that had a different data format, so no data update is required between $V(i), \ldots, V(i+j-1)$, and $V(i+j+k)$, while it is still required between $V(i), \ldots, V(i+j-1)$ and $V(i+j)$ and $V(i+j), \ldots, V(i+j+k-1)$ and $V(i+j+k)$.

Figure 4:
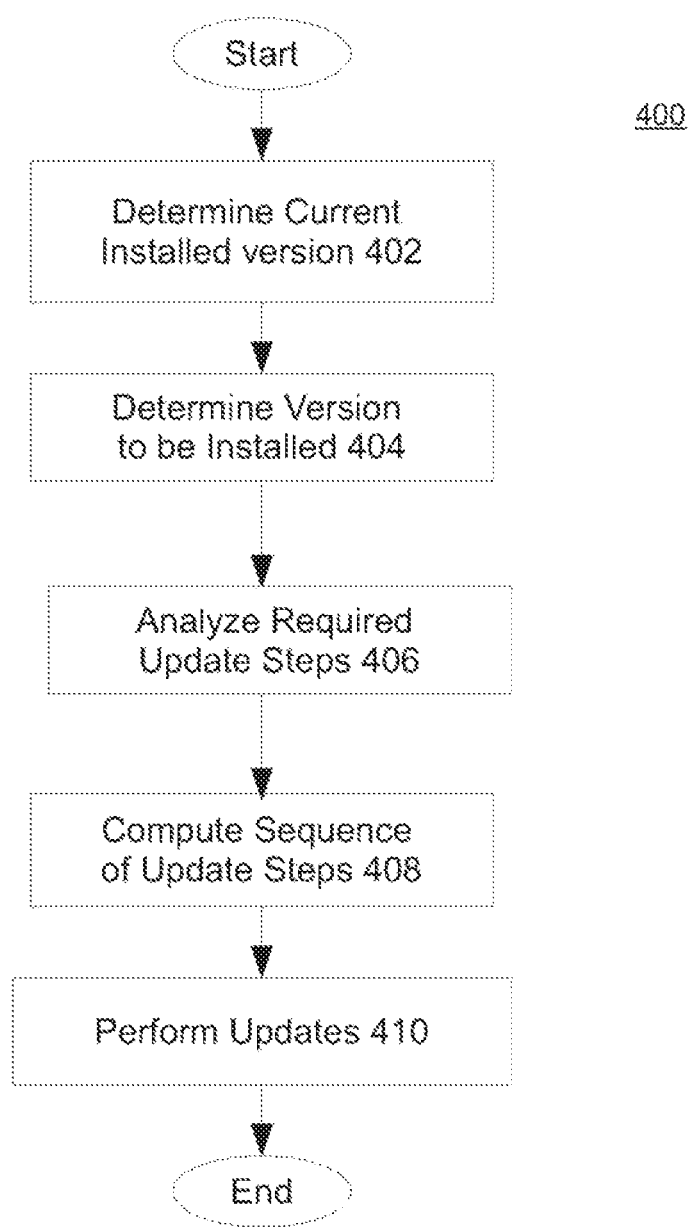
FIG. 4 is a flow diagram illustrating an embodiment of a system for using DAG for application updates.

FIG. 4 is a flowchart of an embodiment of a method 400 of using DAG for updating applications. In step 402, the current installed version is determined and, in this discussion the current version is represented as $V(i)$. If the current installed version is different from the version to be installed, an update may be needed.

In step 404, the version to be installed is determined and, in this discussion, is represented as $V(i+j)$. The version to be installed may be the newest version of the application. However, in at least one embodiment, the version to be installed is a newer version of the application. Also, there may be different levels of service, and the update may accommodate a higher level of service then the level of service of the version currently installed. The version to be installed may be separated from the current installed version by one or more other versions that may need, no format change, small format changes and/or large format changes.

In step 406, each of the required updates are analyzed as to whether the update includes a format change. In other words, the update steps needed to update between the current version and the desired version are analyzed to determine whether the update step involves a format change. The update steps may also be analyzed to determine whether which versions the update steps are related to. Step 402, 404 and the analysis of step 406 may be performed in parallel.

After analyzing the update steps a graph may be built. An update step from version $V(i)$ to version $V(i+j)$ is represented as $E(i, i+j)$. Consecutive updates that do not involve format changes are combined into one update. When there is an update that involves a format update, the subsequent consecutive updates that do not involve a format change (if there are any) may be combined with the update that included the format change (since, in an embodiment, only the update involving the format change needs any operations to be performed). Similarly, the consecutive previous updates, that do not involve a format update, that immediately precede the update that involves a format change may be combined with the update that involves the format change (since, in an embodiment, only the update involving a format change involves any operations).

In step 408, the sequence of updates is computed by the update builder 108. The update builder 108 (see 108 in FIG. 1) may use a graph to figure out the steps that will be needed to perform the update. In this specification the update may be represented as a series of updates $[E(i, i+k), \ldots, E(i+j-1, i+j)]$. Updates corresponding to versions that need format changes are computed sequentially. In at least one embodiment, computing the sequence of updates in a particular update might include the steps of constructing an initial DAG. The initial DAG is in general incomplete. The initial DAG may not have a path from version $V(i)$ to version $V(i+j)$, completing the DAG may involve determining and/or computing an update path that exists between version $V(i)$ to version $V(i+j)$. Step 408 may be implemented by filling in missing vertices and edges for the path, and computing the shortest path between $V(i)$ to $V(i+j)$. Step 408 may be implemented by running a Breadth First Search (BFS) algorithm starting at node $V(i)$.

In an embodiment, the breadth-first search (BFS) may include essentially two operations. The first operation may be visiting and/or inspecting a node of the graph and determining the nature of the update step needed to arrive at the node (a determination may be made whether the update step requires any operations for determining whether a format change is implemented). The second operation may be to gain access to visit the nodes that neighbor the currently visited node that have not been visited yet (the original node corresponding to the current version of the application is a neighbor to the neighbor nodes, but is not visited, because the original node was visited before visiting the neighbor nodes). In an embodiment, the BFS begins at a root node, which is the current version installed on the user device and inspects all the neighboring nodes.

Although the graph is essentially linear there may be more than one node that neighbors the current node (which needs to be inspected), because some update steps may be unnecessary if the update is to a version that is past a certain point. To elaborate, each version is linked to the next version by an update step. However, in some cases a version may also be linked to a version several versions later, if one set of update steps undoes an earlier set of update steps or makes an earlier set of update steps unnecessary. For example, one update step may add a column to a table and a later update step may remove the table from the schema, making the addition of the column unnecessary. Then for each of the neighbor nodes arrived at, in turn, the BFS search inspects the neighboring nodes that were not visited, yet. In an embodiment, the BFS may use a queue data structure to store intermediate results as the BFS algorithm traverses the graph. The root node, which may be the currently installed version of the application may be placed into the queue. A node may be removed from the queue and examined. If the final update is found, the search is complete, and the computed sequence of updates is returned. Otherwise, the node is placed into the queue any successors (the direct child nodes) that have not yet been inspected. If the queue is empty, every node on the graph has been examined, and an error has occurred and perhaps the graph is not complete. If the queue is not empty, the search returns to the second step and performs the subsequent operations in sequence.

In step 410, the update(s) are performed by combining the update steps of each sequence of update steps that does not involve a format change. For example, if the update from version V(i) to V(i+1) involves a format change, the update from version V(i+j−1) to V(i+j) involves a format change, and the update from version V(i+j+k−1) to V(i+j+k) involve a format change, while the remaining updates do not involve a format change, the no operation updates may be combined with the update just prior to the no operation update forming update steps E(i, i+j−1), E(i+j−1, i+j+k−1), E(i+j+k−1, i+j+k). The first of update in each of updates E(i+j−1, i+j+k−1), E(i+j+k−1, i+j+k), involves a change in format, which have each been combined with a subsequent series of no operation updates into one update. Since there are no changes required between V(i+1), V(i+j), the no operation (NOP) update steps V(i+1), V(i+j) are combined with the update from V(i) to V(i+1) to from E(i, i+j). Similarly, since there are no changes required between V(i+j+1), V(i+j+k−1), the no operation (NOP) update steps between V(i+j+1) and V(i+j+k−1) are combined with the update from V(i+j) to V(i+j+1) to form E(i+j, i+j+k−1). Consequently, instead of performing j+k update steps only 3 update steps are performed to update the version from version V(i) to version V(i+j+k). Alternatively, the updates that do not involve a format change (the no operation updates) may be combined with a subsequent update step that involves a format change or may not be combined with any other update step.

In an embodiment, each of the steps of method 400 is a distinct step. In at least one embodiment, although depicted as distinct steps in FIG. 4, step 402-410 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Figure 5:
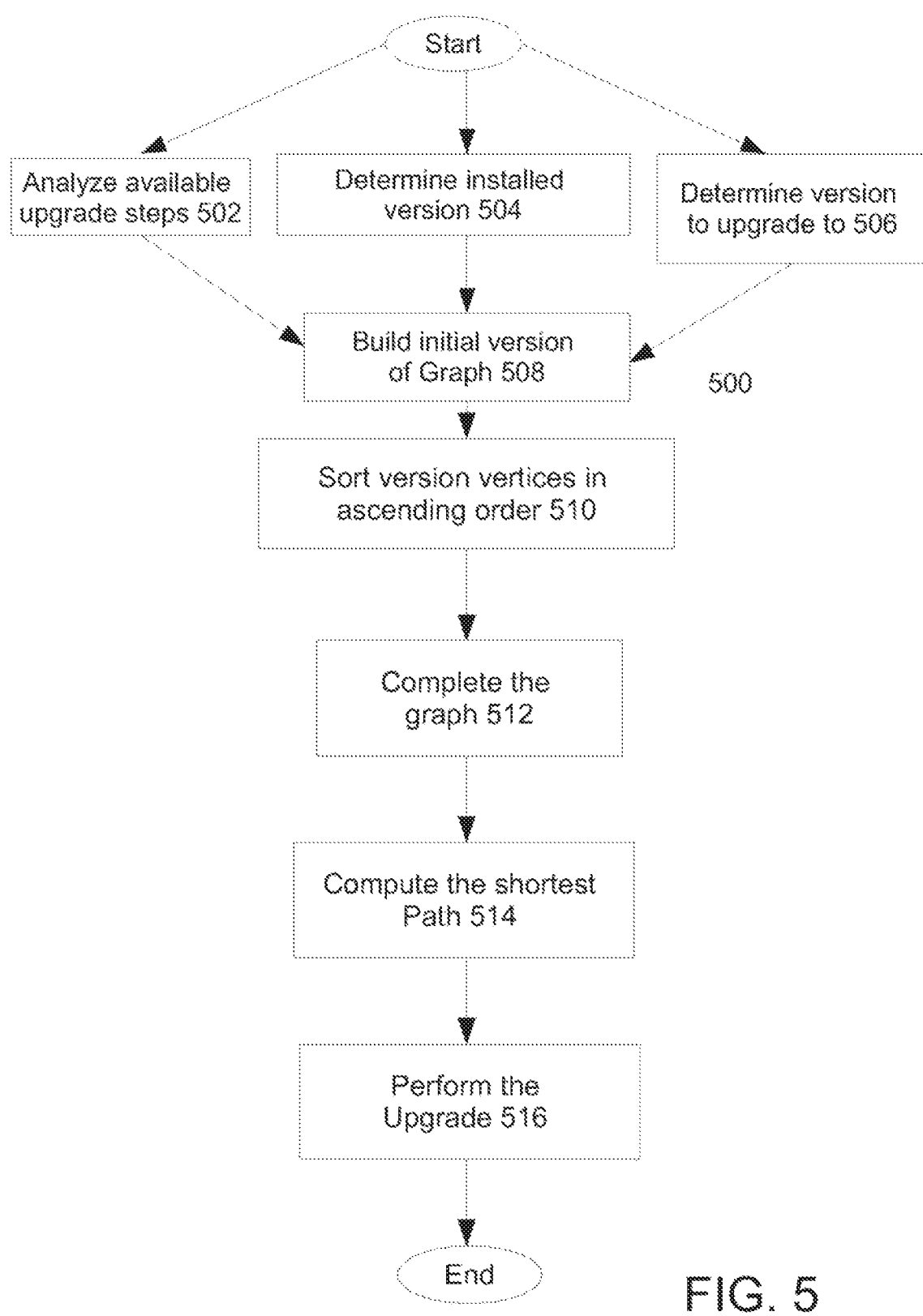
FIG. 5 is a flow diagram illustrating an embodiment of a system for using DAG for application updates.

FIG. 5 is a flowchart of an embodiment of a method 500 for using a DAG for updating an application. Method 500 may be an embodiment of method 500. FIG. 5 is more detailed than FIG. 4. Method 500 computes an update from any version to the current version while skipping unnecessary steps.

Steps 502-506 can occur in parallel. In step 502, available update steps are analyzed. In at least one embodiment, the update steps are inspected to determine which update steps proceed which other update steps and which update steps are linked to which other update steps and/or versions, so that an initial graph can be constructed. Optionally, a determination is made regarding which update steps involves a format change and whether a particular update step undoes a prior update step or otherwise makes a prior update step unnecessary.

In step 504, the installed version is determined. In step 506, the version to upgrade to is determined. In an example, the installed version is version four (V4) (which is determined by step 504) and the newest version is version 10 (V10) (which is determined by step 506). If the user wants an update to the newest version, the algorithm identifies the version to upgrade to as V10.

In step 508, an initial version of a graph is built. The initial version might include only versions that are linked by updates that involved an operation, such as a format change. For example, the graph of FIG. 3B may constructed, which is missing version number V8 and V9, because no update step exists in archive of update steps 104 that links to versions V8 and V9. Similarly edges E(8,9), E(9,10), and E(11,12) do not exist be cause there was no corresponding update step computed for updating from version V8 to V9, V9 to V10 or V11 to V12.

In step 510, version vertices are sorted in ascending order in preparation for a BFS search of the graph.

In step 512, the graph is completed by filling in missing nodes and edges, corresponding to the missing versions and update steps. Optionally, the completed graph may also include information, such as whether or not a format change is needed at a given update step. The completed graph may include paths between each pair version formed by update steps that are sequentially next to one another. The completed graph may also include paths skipping over update pairs of steps in which one update makes a prior update unnecessary.

In step 514, the shortest path from the installed version to the version to update to is computed by running the breadth first search (BFS) algorithm. Computing the shortest path, allows the algorithm to combine updates that do not involve a format change.

In step 516, the update is performed along the shortest path, skipping the versions that do not include a format change.

In an embodiment, each of the steps of method 500 is a distinct step. In at least one embodiment, although depicted as distinct steps in FIG. 5, step 502-516 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

System Overview

Figure 6:
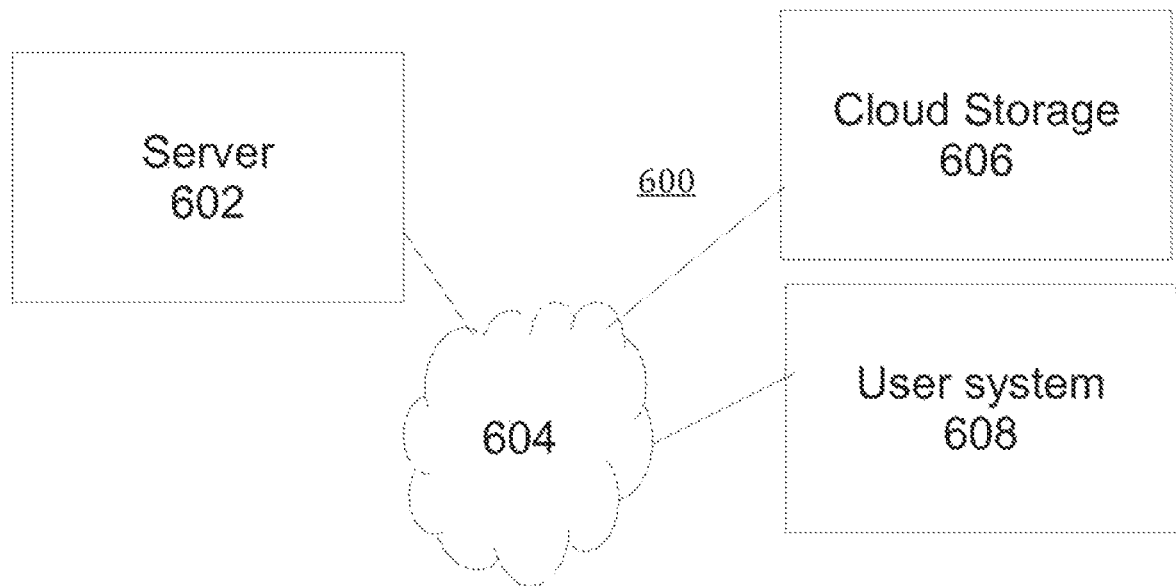
FIG. 6 illustrates a block diagram of an embodiment of a system in which a method for using directed acyclic graph (DAG) for application updates can be used.

FIG. 6 illustrates a block diagram of an embodiment of a system 600 in which methods of using directed acyclic graph (DAG) for application updates can be used, which may include embodiments of server 602, network 604, cloud storage 606, and user system 608. In other embodiments, system 600 may not have all of the elements or components listed above and/or may have other elements or components instead of or in addition to those listed.

Server 602 may be directly connected and/or wirelessly connected to the plurality of user systems 608 and are connected via the communications network 604. Server 602 functions to update one or more applications on the user system. Server 602 may function to compute what update the user system has, what update the user system needs and to perform the update. Server system 602 may be a multi-tenant database. Server system 602 may be an embodiment of server system 101 and/or substituted for sever system 101.

Communications network 604 may be any one of, or any combination of, one or more Local Area Networks (LANs), Wide Area Networks (WANs), wireless networks, telephone networks, the Internet and/or other networks. Communications network 604 may include one or more wireless portals. Communication network 604 may be an embodiment of network 112 and/or substituted for network 112.

Cloud storage 606 is storage that may be relied upon by the user system for storing information. Optionally, information needed to run the application on the user system may also be stored in cloud storage 606. Optionally, cloud storage 606 may be included in system 100.

User systems 608 are any system that an end user may use to access the server system 602. For example, user systems 608 may be personal computers, workstations, laptop computers, game consoles, handheld network enabled audio/video players and/or any other network appliance. User systems 608 may be a smart phone with an application that allows it to access the user's portion of a multitenant database. The application on the user system 608 is updated via the server 602. The user system may store the application and/or the application that allows it to access the user's portion of a multitenant database at the server or within the communications network 604. User system 608 may be an embodiment of client device 114 and/or substituted for client device 114.

Figure 7:
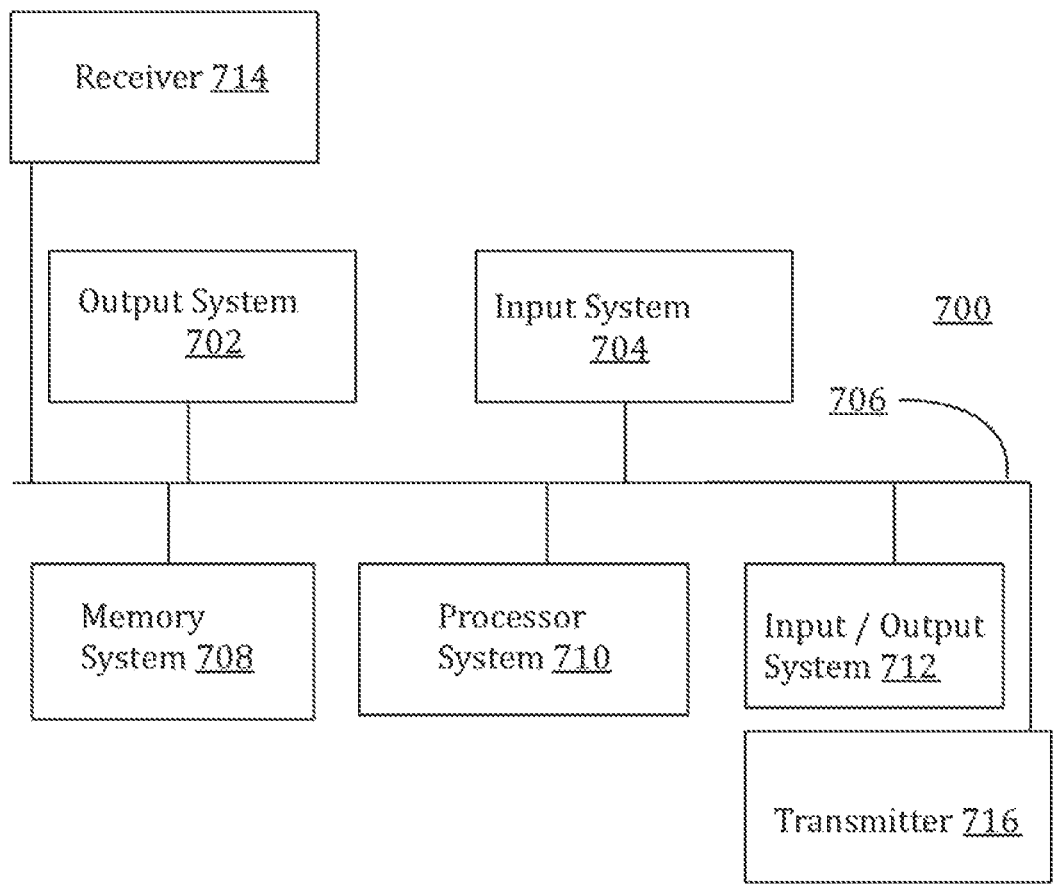
FIG. 7 illustrates a block diagram of an embodiment of a telephone on which a system for using directed acyclic graph (DAG) for application updates is used.

FIG. 7 illustrates an example of a block diagram of a user system 700. User system 700 may include embodiments of output system 702, input system 704, communications system 706, memory system 708, processor system 710, input/output system 712, receiver 714, and transmitter 716. In other embodiments, user system 700 may not have all of the elements or components listed above and/or may have other elements or components instead of or in addition to those listed.

User system 700 is an example of a user device that may be used for client device 114, which may be used as a computer or processor in any of FIGS. 1-6 and 8-11 and/or may be part of a telephone.

Output system 702 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 704 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Communications system 706 communicatively links output system 702, input system 704, memory system 708, processor system 710, and/or input/output system 712 to each other. Communications system 706 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Memory system 708 may include, for example, any one of, some of, any combination of, or all of a long term storage system, such as a hard drive; a short term storage system, such as random access memory; a removable storage system, such as a floppy drive or a removable drive; and/or flash memory. Memory system 708 may include one or more machine-readable mediums that may store a variety of different types of information. The term machine-readable medium is used to refer to any nontransitory machine readable medium capable carrying information that is readable by a machine. One example of a machine-readable medium is a computer-readable medium. Memory system 708 may include algorithms for constructing directed acyclical graphs, identifying format changes, and/or building an update plan.

Processor system 710 may include any one of, some of, any combination of, or all of multiple parallel processors, a single processor, a system of processors having one or more central processors and/or one or more specialized processors dedicated to specific tasks. Processor carries out the machine instructions stored in memory system 708.

Input/output system 712 may include devices that have the dual function as input and output devices. For example, input/output system 712 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 712 is optional, and may be used in addition to or in place of output system 702 and/or input system 704.

Receiver 714 may include devices that can receive transmissions such as sound and electronic information. The receiver may be communicatively coupled to one or more antennae.

Transmitter 716 may include devices that can transmit information such as sound, and electronic information. The transmitter may act to send a message. The receiver may be communicatively coupled to one or more antennae.

The user system 700 may be a smartphone and may also contain a microphone and speaker that allow the user to transmit and receive messages. Optionally, user system 700 may also be used as system 101 or server system 602.

Figure 8:
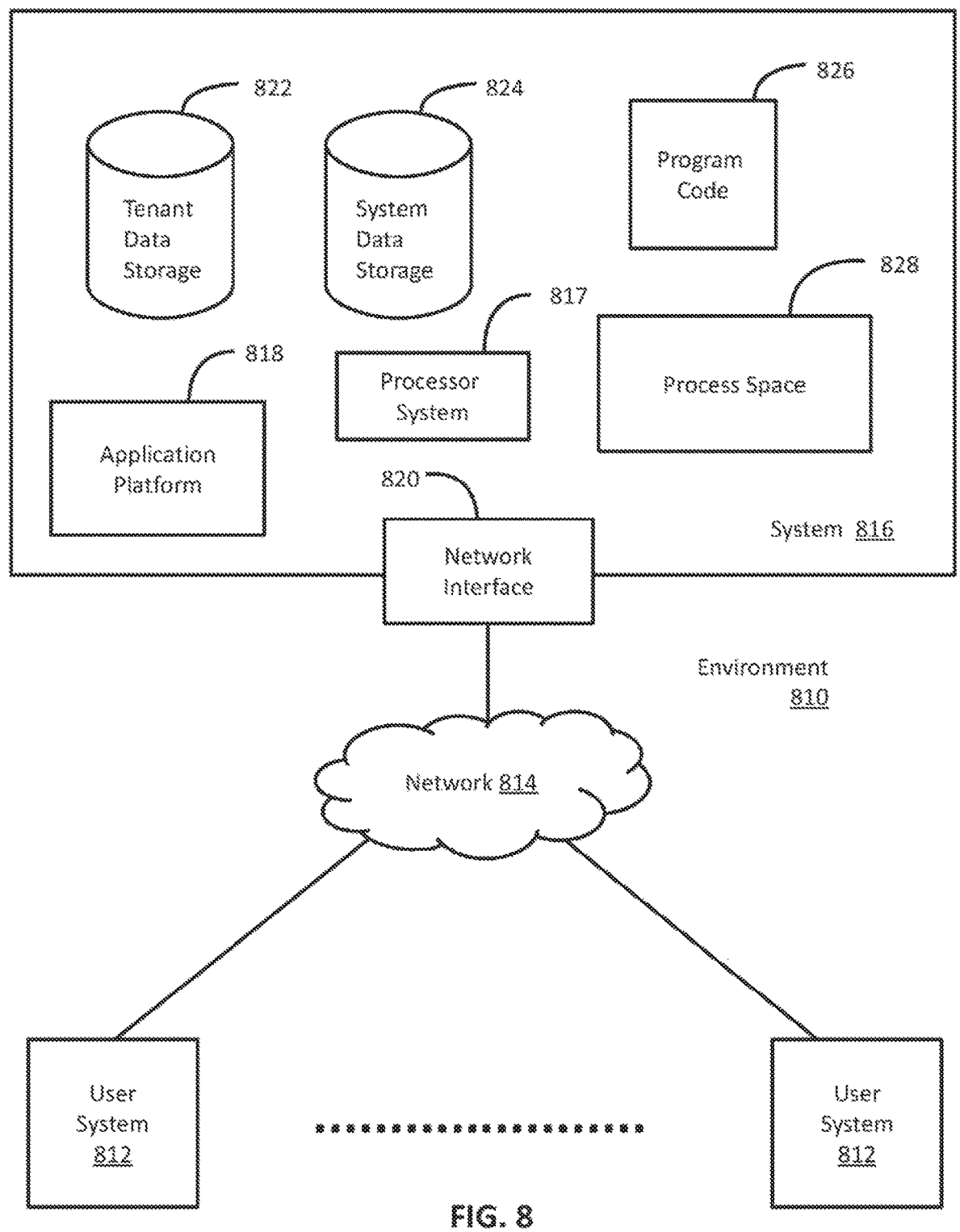
FIG. 8 illustrates a block diagram of an embodiment of a system in which an on-demand database service may be used.

FIG. 8 illustrates a block diagram of an environment 810 wherein an on-demand database service might be used. Environment 810 may include user systems 812, network 814, system 816, including, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8 (and in more detail in FIG. 7) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 923, system data storage 824 for system data 925 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
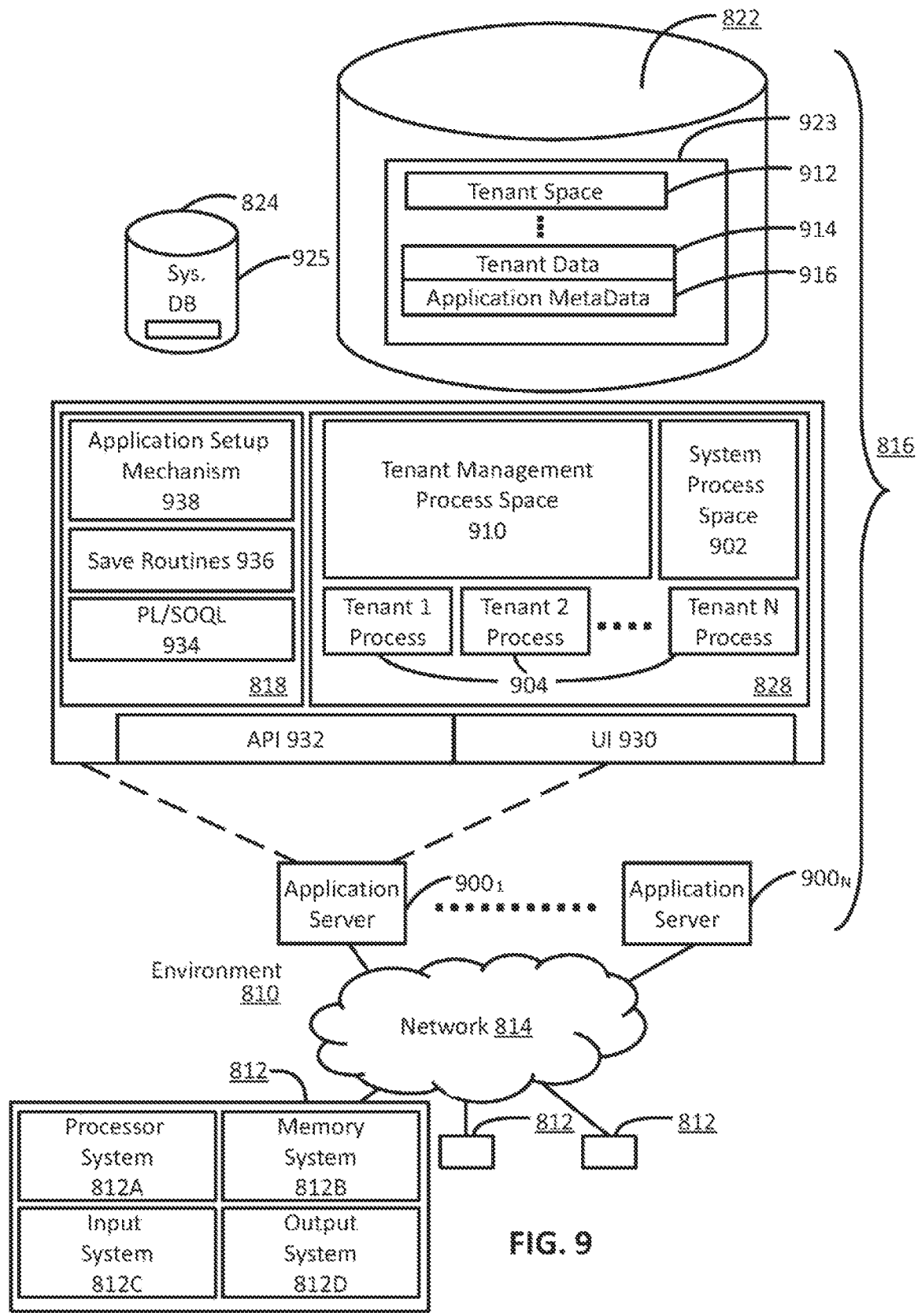
FIG. 9 illustrates an embodiment of the environment of FIG. 8 and various possible interconnections between these elements.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 8 shows network 814 and system 816. FIG. 9 also shows that system 816 may include tenant data storage 822, tenant data 923, system data storage 824, system data 925, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 8, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 923 therein, and system data storage 824 and the system data 925 therein to serve requests of user systems 812. The tenant data 923 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 4006, which is incorporated in its entirety herein for all purposes. Invocations to applications may be detected by one or more system processes, which manages retrieving application metadata 916 for the subscriber making the invocation and executing the metadata as an application in a virtual machine.

Each application server 900 may be communicably coupled to database systems, e.g., having access to system data 925 and tenant data 923, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/818,161, filed Apr. 2, 4004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
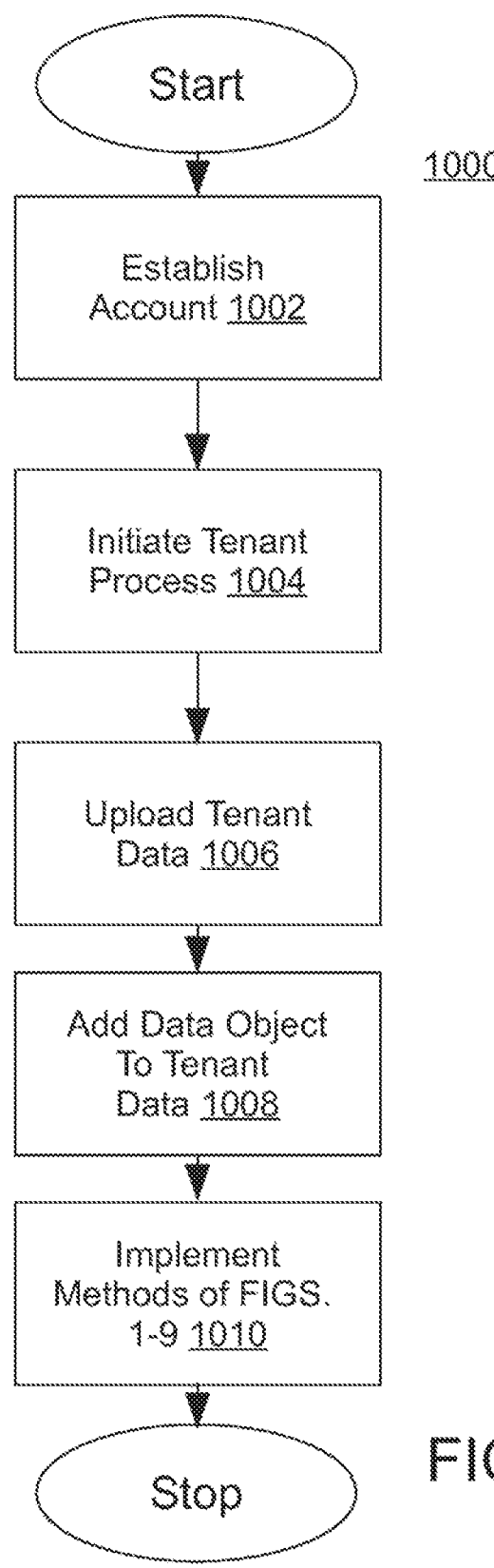
FIG. 10 illustrates a flow diagram of an example of a method of using the environment of FIG. 8.

Method for Using the Environment (FIG. 10)

FIG. 10 shows a flowchart of an example of a method 1000 of using environment 810. In step 1002, user system 812 (FIGS. 8 and 9) establishes an account. In step 1004, one or more tenant process space 904 (FIG. 9) are initiated on behalf of user system 812, which may also involve setting aside space in tenant space 912 (FIG. 9) and tenant data 914 (FIG. 9) for user system 812. Step 1004 may also involve modifying application metadata to accommodate user system 812. In step 1006, user system 812 uploads data. In step 1008, one or more data objects are added to tenant data 914 where the data uploaded is stored. In step 1010, the methods associated with FIGS. 1-9 may be implemented. For example, in step 1010, the shortest path from the installed version to the version to upgrade can be computed by running the BF-search algorithm (see step 514 in FIG. 5). In another embodiment, although depicted as distinct steps in FIG. 10, steps 1002-1010 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

Figure 11:
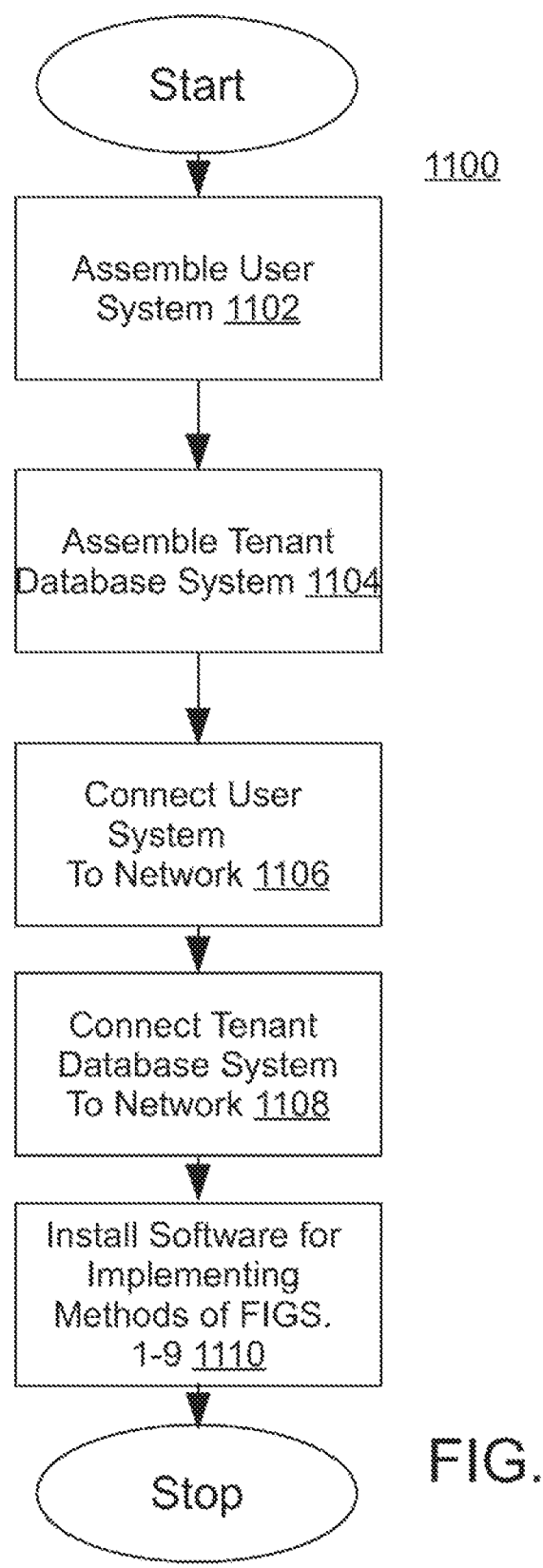
FIG. 11 illustrates a flow diagram of an example of a method of making the environment of FIG. 8.

Method for Creating the Environment (FIG. 11)

FIG. 11 is a method of making environment 810, in step 1102, user system 812 (FIGS. 8 and 9) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1104, system 816 (FIGS. 8 and 9) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 816 may include installing application platform 818, network interface 820, tenant data storage 822, system data storage 824, system data 925, program code 826, process space 828, UI 930, API 932, PL/SOQL 934, save routine 936, application setup mechanism 938, applications servers 1001-100N, system process space 902, tenant process spaces 904, tenant management process space 910, tenant space 912, tenant data 914, and application metadata 916 (FIG. 9).

In step 1106, user system 812 is communicatively coupled to network 814. In step 1108, system 816 is communicatively coupled to network 814 allowing user system 812 and system 816 to communicate with one another (FIG. 9). In step 1110, one or more instructions may be installed in system 816 (e.g., the instructions may be installed on one or more machine readable media, such as computer readable media, therein) and/or system 816 is otherwise configured for performing the steps of methods associated with FIGS. 2,4, and 5. For example, the graph builder may be installed in program code 826 of system 816. In an embodiment, each of the steps of method 1100 is a distinct step. In another embodiment, although depicted as distinct steps in FIG. 11, steps 1102-1110 may not be distinct steps. In other embodiments, method 1100 may not have all of the above steps and/or may have other steps in addition to, or instead of, those listed above. The steps of method 1100 may be performed in another order. Subsets of the steps listed above as part of method 1100 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:

determining, with one or more processors that are part of a server system, a sequence of update steps from a currently installed version of a client application on a remote client device having one or more processors and a user interface to a new version of the client application to be installed on the client device;

building a representation of updates as an update graph having nodes that represent versions and edges that represent update steps based on the currently installed version of the client application to the new version of the client application including one or more intermediate versions and also wherein the graph is initially constructed as an incomplete graph based on update steps stored in an archive of updates and supplemented with information for filling the portions of the graph that correspond to missing versions and updates with the one or more processors that are part of the server system;

storing the representation of the update graph in at least one memory device coupled with the one or more processors that are part of the server system;

determining, with the one or more processors that are part of the server system utilizing the update graph, a shortest update path between the currently installed version of the client application and the new version of the client application, wherein the shortest update path comprises the smallest number of update steps between the currently installed version of the client application and the new version of the client application;

determining, with the one or more processors that are part of the server system utilizing the update graph, whether any of the update steps can be skipped as being no operation updates or undoing changes made by previous updates;

determining, with the one or more processors that are part of the server system utilizing the update graph, an update sequence from a combination of the sequence of update steps unique to the shortest update path between the currently installed version of the client application and the new version of the client application and omitting the update steps that can be skipped; and building, with the one or more processors that are part of the server system, an update package to update the currently installed version of the client application to the new version of the client application based on the determination utilizing the update graph.

2. The method of claim 1, wherein the update path from the currently installed version of the client application to the new version of the client application includes at least a change to a structure of a schema.

3. The method of claim 1, wherein the update path from the currently installed version of the client application to the new version of the client application includes at least a change to a structure of a table.

4. The method of claim 1 wherein the client device comprises a smart phone.

5. The method of claim 1, the server system further provides an on-demand multi-tenant database environment.

6. The method of claim 1, wherein the building the representation comprises creating a directed acyclic graph (DAG) of the update steps and the determining the series of update steps to apply are based on the directed acyclic graph.

7. The method of claim 6, wherein the sequence of update steps is computed by starting with a first node, representing the currently installed version, inspecting each neighboring nodes and determining properties of each update step needed to arrive at neighboring nodes;

repeating the inspecting and determining of properties of each new neighbor of each prior neighbor, if the new neighbor was not yet inspected; and repeating the inspecting and determining of properties of each new neighbor of each prior neighbor until the node corresponding to the new version is reached.

8. The method of claim 7, further comprising:
computing the shortest path from the installed version to the version to update to by starting with a first node, representing the currently installed version, inspecting each neighboring nodes and determining properties of each update step needed to arrive at neighboring nodes;
repeating the inspecting and determining of properties of each new neighbor of each prior neighbor, if the new neighbor was not yet inspected; and
repeating the inspecting and determining of properties of each new neighbor of each prior neighbor until the node corresponding to the new version is arrived at; and
performing the update along the shortest path of the graph found between the current version and the new version.

9. The method of claim 1, further comprising analyzing the available update steps to determine at least whether the step includes a format change.

10. The method of claim 1, further comprising:
determining the currently installed version;
determining the new version being installed;
analyzing the available update steps to determine at least whether the step includes a format change;
building an initial version of a graph of the update steps;
sorting version vertices of the graph in ascending order;
determining whether the graph is missing vertices;
determining whether the graph is missing connections;
completing the graph, if vertices or connections are missing;
computing the shortest path from the installed version to the version to update to by running a breadth-first search (BFS) on the graph; and
performing the update along the shortest path of the graph.

11. A non-transitory computer-readable medium having stored thereon instructions that, when executed by one or more processors, cause the one or more processors to:
determine a sequence of update steps from a currently installed version of a client application on a remote client device having one or more processors and a user interface to a new version of the client application to be installed on the client device;
build a representation of updates as an update graph having nodes that represent versions and edges that represent update steps based on the currently installed version of the client application to the new version of the client application including one or more intermediate versions and also wherein the graph is initially constructed as an incomplete graph based on update steps stored in an archive of updates and supplemented with information for filling the portions of the graph that correspond to missing versions and updates with the one or more processors that are part of the server system;
store the representation of the update graph in at least one memory device coupled with the one or more processors;
determine, utilizing the update graph, a shortest update path between the currently installed version of the client application and the new version of the client application, wherein the shortest update path comprises the smallest number of update steps between the currently installed version of the client application and the new version of the client application;
determine whether any of the update steps can be skipped as being no operation updates or undoing changes made by previous updates;
determine an update from a combination of the sequence of update steps unique to the shortest update path between the currently installed version of the client application and the new version of the client application and omitting the update steps that can be skipped; and
build an update package to update the currently installed version of the client application to the new version of the client application based on the determination utilizing the update graph.

12. The non-transitory computer-readable medium of claim 11, wherein the update path from the currently installed version of the client application to the new version of the client application includes at least a change to a structure of a schema.

13. The non-transitory computer-readable medium of claim 11, wherein the update path from the currently installed version of the client application to the new version of the client application includes at least a change to a structure of a table.

14. The non-transitory computer-readable medium of claim 11 wherein the client device comprises a smart phone.

15. The non-transitory computer-readable medium of claim 11, wherein the building the representation comprises creating a directed acyclic graph (DAG) of the update steps and the determining the series of update steps to apply are based on the directed acyclic graph.

16. The non-transitory computer-readable medium of claim 15, wherein the sequence of update steps is computed by
starting with a first node, representing the currently installed version, inspecting each neighboring nodes and determining properties of each update step needed to arrive at neighboring nodes;
repeating the inspecting and determining of properties of each new neighbor of each prior neighbor, if the new neighbor was not yet inspected; and
repeating the inspecting and determining of properties of each new neighbor of each prior neighbor until the node corresponding to the new version is reached.

17. The non-transitory computer-readable medium of claim 16, further comprising instruction that, when executed by the one or more processors, cause the one or more processors to:
compute the shortest path from the installed version to the version to update to by starting with a first node, representing the currently installed version, inspecting each neighboring nodes and determining properties of each update step needed to arrive at neighboring nodes;
repeat the inspecting and determining of properties of each new neighbor of each prior neighbor, if the new neighbor was not yet inspected; and
repeat the inspecting and determining of properties of each new neighbor of each prior neighbor until the node corresponding to the new version is arrived at; and
perform the update along the shortest path of the graph found between the current version and the new version.

18. The non-transitory computer-readable medium of claim 11, further comprising instructions that, when executed by the one or more processors, cause the one or more processors to analyze the available update steps to determine at least whether the step includes a format change.

19. The non-transitory computer-readable medium of claim 11, further comprising instruction that, when executed by the one or more processors, cause the one or more processors to:
    determine the currently installed version;
    determine the new version being installed;
    analyze the available update steps to determine at least whether the step includes a format change;
    build an initial version of a graph of the update steps;
    sort version vertices of the graph in ascending order;
    determine whether the graph is missing vertices;
    determine whether the graph is missing connections;
    complete the graph, if vertices or connections are missing;
    compute the shortest path from the installed version to the version to update to by running a breadth-first search (BFS) on the graph; and
    perform the update along the shortest path of the graph.

* * * * *